United States Patent
Okanishi et al.

(10) Patent No.: US 12,112,348 B2
(45) Date of Patent: Oct. 8, 2024

(54) POINT GRANTING DEVICE AND POINT GRANTING METHOD

(71) Applicant: TOYOTA JIDOSHA KABUSHIKI KAISHA, Toyota (JP)

(72) Inventors: Daisuke Okanishi, Miyoshi (JP); Hiroki Nagai, Aichi-ken (JP); Takaaki Matsui, Seto (JP); Koichiro Isobe, Toyota (JP); Kentaro Suzuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/209,264

(22) Filed: Jun. 13, 2023

(65) Prior Publication Data

US 2024/0046299 A1  Feb. 8, 2024

(30) Foreign Application Priority Data

Aug. 5, 2022  (JP) .................. 2022-125771

(51) Int. Cl.
G06Q 30/00    (2023.01)
G06Q 30/0226  (2023.01)

(52) U.S. Cl.
CPC ................ G06Q 30/0231 (2013.01)

(58) Field of Classification Search
None
See application file for complete search history.

(56) References Cited

U.S. PATENT DOCUMENTS

| | | | |
|---|---|---|---|
| 2009/0144149 A1 | 6/2009 | Sakakibara et al. | |
| 2009/0313103 A1* | 12/2009 | Ambrosio | B60L 53/64 705/14.34 |
| 2009/0313104 A1* | 12/2009 | Hafner | G06Q 20/10 705/14.25 |
| 2012/0054017 A1* | 3/2012 | Rao | G06Q 30/0239 705/14.1 |

(Continued)

FOREIGN PATENT DOCUMENTS

| | | |
|---|---|---|
| JP | 2009-134450 A | 6/2009 |
| JP | 2012-059197 A | 3/2012 |

(Continued)

OTHER PUBLICATIONS

Ofgem, "Enabling the transition to electric vehicles: The regulator's priorities for a green, fair future ", https://www.ofgem.gov.uk/sites/default/files/2021-09/Enabling%20the%20transition%20to%20electric%20vehicles%20-%20the%20regulators%20priorities%20for%20a%20green%20fair%20future.pdf, 2021 (Year: 2021).*

(Continued)

*Primary Examiner* — Michael Bekerman
(74) *Attorney, Agent, or Firm* — Sughrue Mion, PLLC

(57) ABSTRACT

When electrified vehicle is a vehicle capable of externally charging electric power, the point granting device imparts a point in accordance with a ratio of the amount of electric power obtained from renewable energy to the amount of electric power charged. In addition, when electrified vehicle is a vehicle traveling using electric power, the point granting device imparts a point in response to the actual electric power cost achieved by the traveling being equal to or higher than the modeled electric power cost.

5 Claims, 8 Drawing Sheets

(56) References Cited

U.S. PATENT DOCUMENTS

| | | | |
|---|---|---|---|
| 2013/0218427 A1* | 8/2013 | Mukhopadhyay | G06F 17/00 |
| | | | 701/99 |
| 2014/0049216 A1* | 2/2014 | Nakagawa | B60L 55/00 |
| | | | 320/109 |
| 2017/0091878 A1* | 3/2017 | Subburaj | H02J 3/32 |
| 2019/0137278 A1 | 5/2019 | Sakuma et al. | |
| 2021/0031647 A1* | 2/2021 | Arima | B60S 5/06 |
| 2021/0065073 A1* | 3/2021 | Maeda | H04L 67/52 |
| 2022/0281344 A1* | 9/2022 | O'Keefe | G06Q 30/0224 |
| 2023/0196234 A1* | 6/2023 | Bhimani | B60L 53/68 |
| | | | 705/7.25 |
| 2024/0067031 A1* | 2/2024 | Meroux | B60L 53/305 |
| 2024/0070572 A1* | 2/2024 | Oki | G06Q 10/0631 |

FOREIGN PATENT DOCUMENTS

| | | | | |
|---|---|---|---|---|
| JP | 2014-035666 A | 2/2014 | | |
| JP | 2018-190249 A | 11/2018 | | |
| JP | 2019-086430 A | 6/2019 | | |
| WO | WO-2015013686 A1 * | 1/2015 | | B60L 1/003 |
| WO | WO-2020027196 A1 * | 2/2020 | | B60L 53/64 |
| WO | WO-2023250213 A1 * | 12/2023 | | |

OTHER PUBLICATIONS

Cao, Yongsheng, et al. "Smart online charging algorithm for electric vehicles via customized actor-critic learning." IEEE Internet of Things Journal 9.1 (2021): 684-694. (Year: 2021).*

Bhatti, Abdul Rauf, et al. "A Comprehensive Overview of Electric Vehicle Charging using Renewable Energy." (2016). (Year: 2016).*

Zhang, Tianyang, et al. "Real-time renewable energy incentive system for electric vehicles using prioritization and cryptocurrency." Applied energy 226 (2018): 582-594. (Year: 2018).*

* cited by examiner

FIG. 1
<CASE 1: A CASE IN WHICH AN ELECTRIFIED VEHICLE IS A VEHICLE HAVING A MECHANISM CAPABLE OF CHARGING ELECTRIC POWER FROM OUTSIDE>
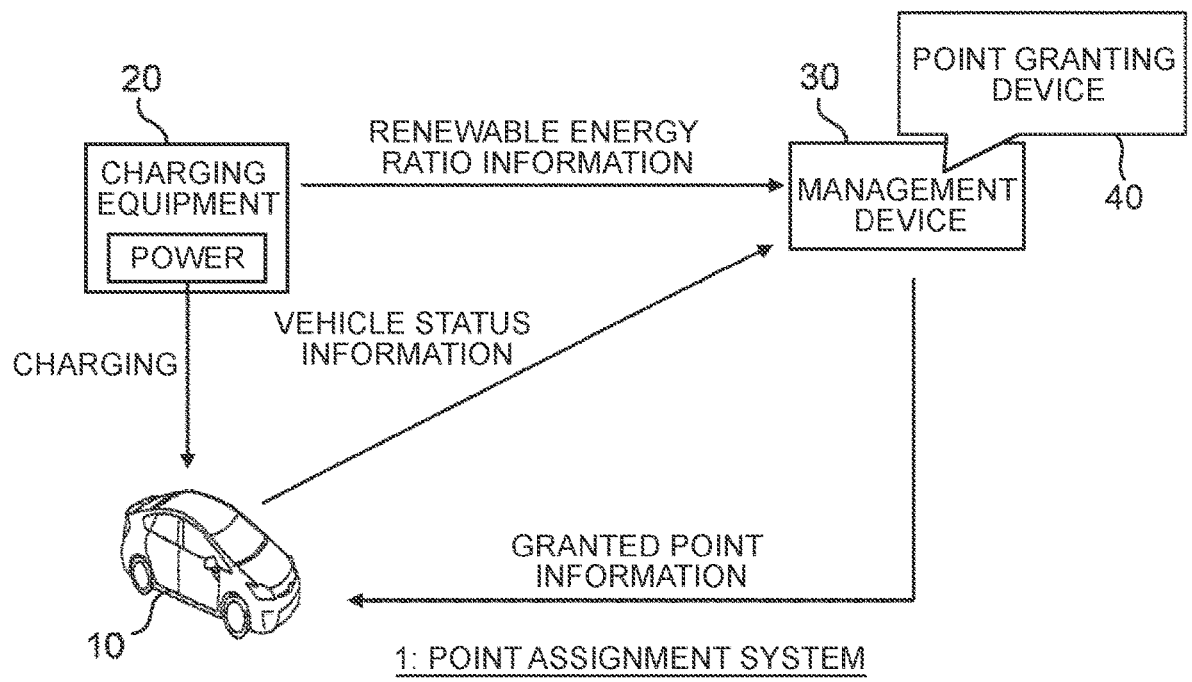
<CASE 2: IN THE CASE OF A VEHICLE IN WHICH AN ELECTRIFIED VEHICLE DOES NOT HAVE A MECHANISM CAPABLE OF CHARGING ELECTRIC POWER FROM THE OUTSIDE>
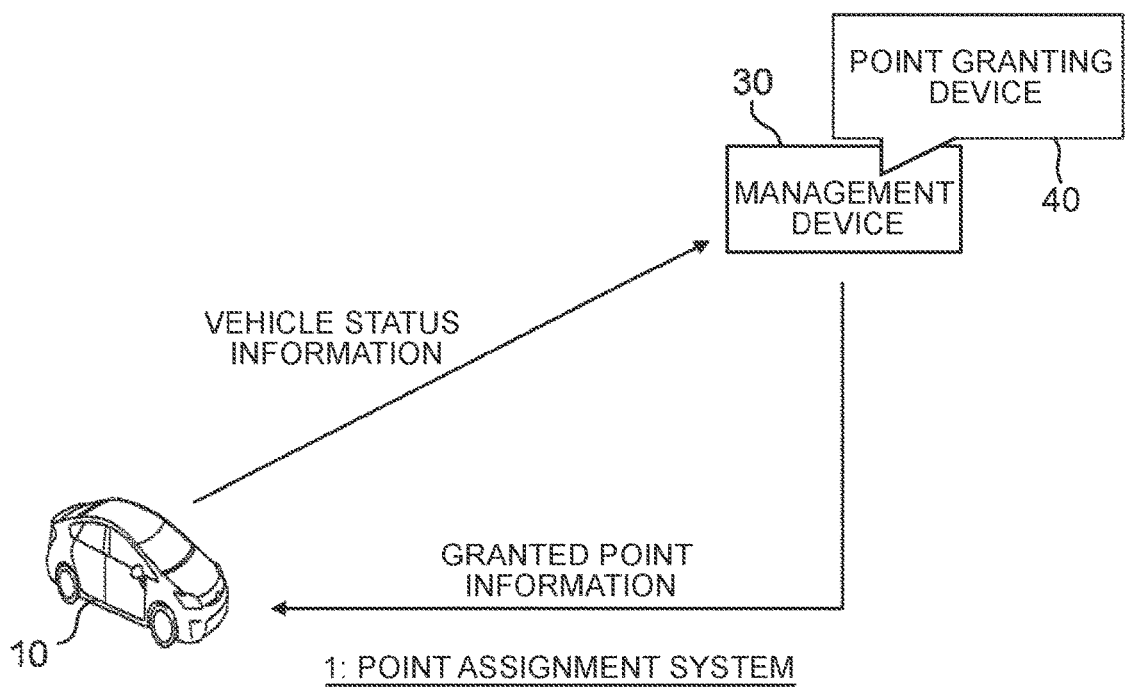

FIG. 2

| VEHICLE | | PERCENTAGE OF ELECTRICITY GENERATED FROM RENEWABLE ENERGY | POINTS GRANTED |
|---|---|---|---|
| ELECTRIFIED VEHICLE CAPABLE OF EXTERNALLY CHARGING ELECTRIC POWER | BATTERY ELECTRIC VEHICLE PLUG-IN HYBRID ELECTRIC VEHICLE | 100% | 1ST POINT → FULL SCORE |
| | | LESS THAN 100% | 2ND POINT → POINTS LOWER THAN THE 1ST POINT |
| ELECTRIFIED VEHICLE THAT IS NOT CAPABLE OF EXTERNALLY CHARGING ELECTRIC POWER | HYBRID ELECTRIC VEHICLE | — (BECAUSE THERE IS NO MECHANISM THAT CAN BE CHARGED EXTERNALLY) | NO POINTS GRANTED |

(LARGE-SMALL RELATIONSHIP OF GRANTED POINTS)
NO POINTS GRANTED < 2ND POINT < 1ST POINT (FULL)

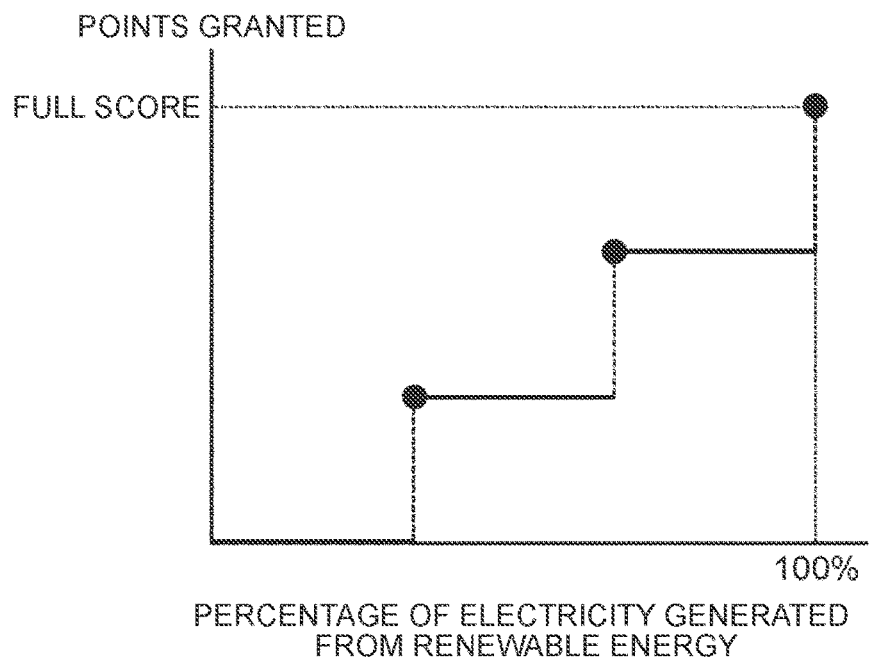

FIG. 3

| VEHICLE | | ACTUAL ELECTRICITY COSTS ACHIEVED DURING DRIVING | POINTS GRANTED |
|---|---|---|---|
| ELECTRIFIED VEHICLE CAPABLE OF EXTERNALLY CHARGING ELECTRIC POWER | BATTERY ELECTRIC VEHICLE | ACTUAL ELECTRICITY COST ≥ MODEL ELECTRICITY COST (NO CARBON DIOXIDE EMISSIONS) | 3RD POINT →FULL SCORE |
| | | ACTUAL ELECTRICITY COST < MODEL ELECTRICITY COST (NO CARBON DIOXIDE EMISSIONS) | POINT 4 →POINT LOWER THAN POINT 3 |
| | PLUG-IN HYBRID ELECTRIC VEHICLE | ACTUAL ELECTRICITY COST ≥ MODEL ELECTRICITY COST (NO CARBON DIOXIDE EMISSIONS) | 3RD POINT →FULL SCORE |
| | | ACTUAL ELECTRICITY COST < MODEL ELECTRICITY COST (WITH CARBON DIOXIDE EMISSION) | NO POINTS GRANTED |
| ELECTRIFIED VEHICLE THAT IS NOT CAPABLE OF EXTERNALLY CHARGING ELECTRIC POWER | HYBRID ELECTRIC VEHICLE | ACTUAL ELECTRICITY COST ≥ MODEL ELECTRICITY COST (NO CARBON DIOXIDE EMISSIONS) | 3RD POINT →FULL SCORE |
| | | ACTUAL ELECTRICITY COST < MODEL ELECTRICITY COST (WITH CARBON DIOXIDE EMISSION) | NO POINTS GRANTED |

(LARGE-SMALL RELATIONSHIP OF GRANTED POINTS)
NO POINTS GRANTED < 4TH POINT < 3RD POINT (FULL)

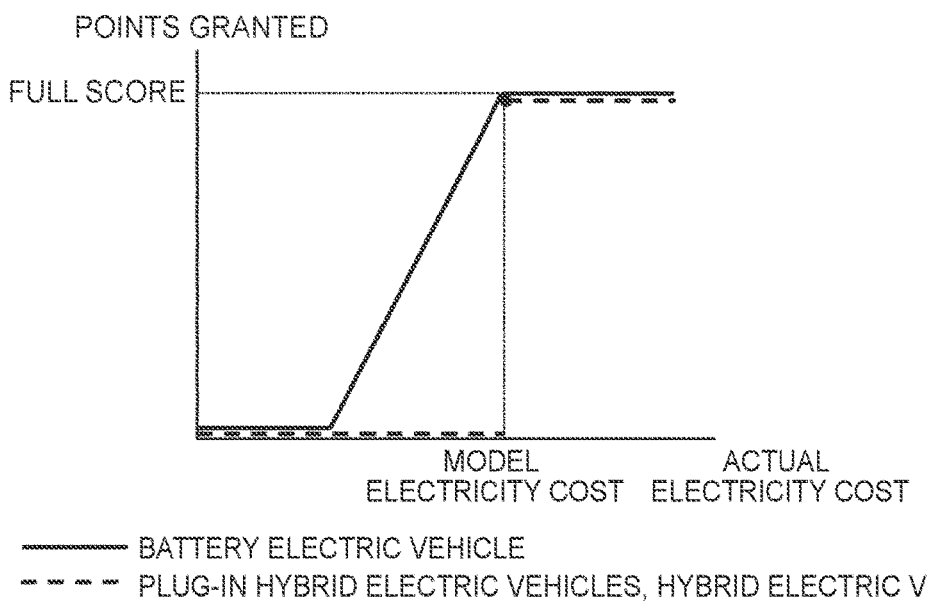

POINT GRANTING DEVICE AND POINT GRANTING METHOD

CROSS-REFERENCE TO RELATED APPLICATION

This application claims priority to Japanese Patent Application No. 2022-125771 filed on Aug. 5, 2022, incorporated herein by reference in its entirety.

BACKGROUND

1. Technical Field

The present disclosure relates to a point granting device of an electrified vehicle.

2. Description of Related Art

Japanese Unexamined Patent Application Publication No. 2014-035666 (JP 2014-035666 A) discloses a technique of granting points in accordance with greenhouse gas emissions reduced by traveling of an electrified vehicle using electric power. According to this technique, the points are calculated based on power consumption results and traveling distance results of the electrified vehicle.

SUMMARY

However, when the electrified vehicle is charged with electric power, the electric power may be generated with carbon dioxide emissions, which is an example of greenhouse gas. In the related art described above, points are uniformly granted to the user of the electrified vehicle regardless of whether carbon dioxide emissions are substantially reduced.

It is an object of the present disclosure to provide a technique capable of granting appropriate points in response to substantially reduced carbon dioxide emissions by use of an electrified vehicle.

A first aspect relates to a point granting device that grants a point in accordance with a carbon dioxide emission amount reduced by use of an electrified vehicle. The point granting device: grants a point in accordance with a ratio of an electric power amount obtained from renewable energy to a charged electric power amount, when the electrified vehicle is an externally chargeable vehicle; and grants the point in response to an actual electric power cost achieved by traveling being equal to or higher than a model electric power cost, when the electrified vehicle is a vehicle that travels using electric power.

A second aspect, in addition to the first aspect, further has the following features. In a case where the electrified vehicle is the externally chargeable vehicle, when the ratio of the electric power amount obtained from the renewable energy is 100%, the point granting device grants a first point. On the other hand, when the ratio is less than 100%, the point granting device grants a second point lower than the first point in accordance with the ratio.

A third aspect, in addition to the first aspect, further has the following features. In a case where the electrified vehicle is the vehicle that travels using electric power, when the actual electric power cost is equal to or higher than the model electric power cost, the point granting device grants a third point. On the other hand, when the actual electric power cost is less than the model electric power cost, the point granting device grants a point lower than the third point or does not grant a point.

A fourth aspect, in addition to the third aspect, further has the following features. The electrified vehicle includes a battery electric vehicle that is provided with a mechanism allowing external charging of electric power and that is able to travel only with charged electric power. In a case where the electrified vehicle is the vehicle that travels using electric power and the actual electric power cost is less than the model electric power cost, and further when the electrified vehicle is the battery electric vehicle, the point granting device grants a fourth point lower than the third point. On the other hand, when the electrified vehicle is not the battery electric vehicle, the point granting device does not grant a point.

A fifth aspect, in addition to the first aspect, further has the following features. When the electrified vehicle is the externally chargeable vehicle, the point granting device further predicts a timing at which a ratio of the electric power amount obtained from the renewable energy to an amount of electric power to be charged from an outside by the electrified vehicle becomes highest. Further, the point granting device notifies the electrified vehicle of the timing as a charge timing.

A sixth aspect, in addition to the fifth aspect, further has the following features. The electric power to be charged is an electric power amount of a difference between an electric power consumption amount and a remaining battery amount predicted during a scheduled traveling period of the electrified vehicle. In a case where the electrified vehicle is the externally chargeable vehicle, and further when the amount of the electric power to be charged is larger than the remaining battery amount, the point granting device notifies the electrified vehicle of the charge timing.

A seventh aspect relates to a point granting method for granting a point in accordance with a carbon dioxide emission amount reduced by use of an electrified vehicle. The point granting method includes: granting a point in accordance with a ratio of an electric power amount obtained from renewable energy to a charged electric power amount, when the electrified vehicle is an externally chargeable vehicle; and granting the point in response to an actual electric power cost achieved by traveling being equal to or higher than a model electric power cost, when the electrified vehicle is a vehicle that travels using electric power.

According to the present disclosure, the point granting device and the point granting method grants a point in accordance with a ratio of electric power obtained from renewable energy to charged electric power, when the electrified vehicle is an externally chargeable vehicle. In addition, the point granting device grants the point in response to an actual electric power cost achieved by traveling being equal to or higher than a model electric power cost, when the electrified vehicle is a vehicle that travels using electric power. Accordingly, it is possible to calculate an appropriate point based on the amount of carbon dioxide emission reduced in charging or traveling of the vehicle. Therefore, appropriate points are granted in accordance with the carbon dioxide emissions reduced by the use of the electrified vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic diagram of a point providing system according to Embodiment 1;

FIG. 2 is a diagram illustrating an example of application points at the time of charging of the point granting device according to the first embodiment;

FIG. 3 is a diagram illustrating an example of application points at the time of traveling of the point granting device according to the first embodiment;

DETAILED DESCRIPTION OF EMBODIMENTS

Figure 4:
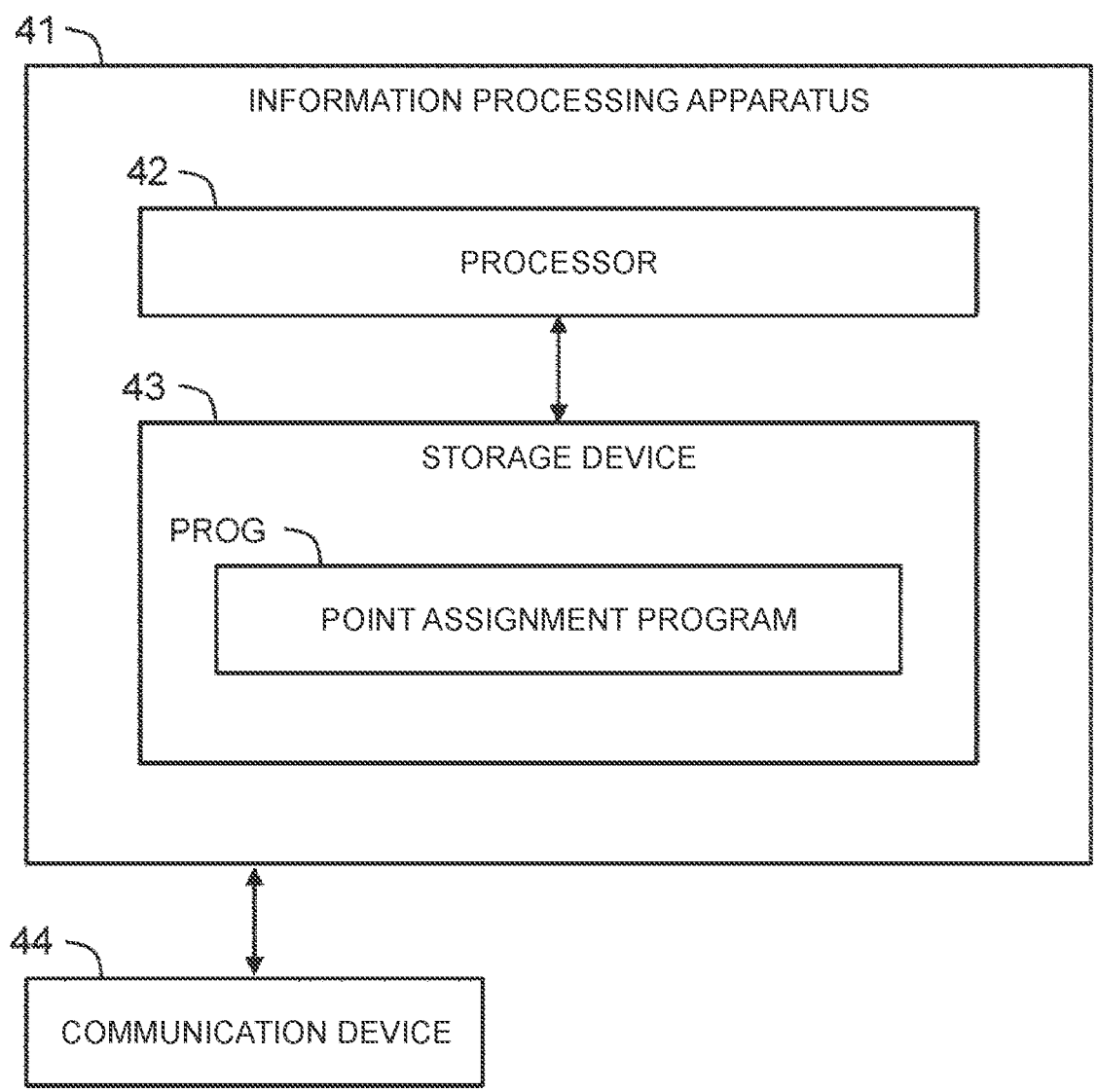
FIG. 4 is a block diagram illustrating a configuration example of a point granting device according to Embodiment 1.

A point granting device and a point granting method according to an embodiment of the present disclosure will be described with reference to the accompanying drawings. Note that the point granting method according to the embodiment is realized by computer processing of the point granting device according to the embodiment.

First Embodiment

Overview of Point Granting System

FIG. 1 is a schematic diagram illustrating a configuration example of a point granting system 1 according to a first embodiment. The point granting system 1 is a system that assigns points according to the amount of carbon dioxide emission reduced by use of the vehicle 10. Examples of the points include an incentive given to a user or a purchaser of the vehicle 10.

The point granting system 1 is classified into two cases according to the type of the vehicle 10. As shown in the top view of FIG. 1, the point granting system 1 in the first case includes a vehicle 10, a charging facility 20, and a management device 30. The point granting system 1 in the second case includes the vehicle 10 and the management device 30 as shown in the lower drawing of FIG. 1. Details of the point granting system 1 according to the type of the vehicle 10 will be described later.

Vehicle 10 is an electrified vehicle including a battery and a drive motor driven by the battery. The vehicle 10 may be a manual driving vehicle or an automatic driving vehicle. The autonomous driving means that at least one of the steering, the acceleration, and the deceleration of the vehicle 10 is automatically performed independently of the operation of the driver. In the present embodiment, for example, it is assumed that the driver does not necessarily have to concentrate on 100% driving (so-called level 3 or more automatic driving) as the automatic driving.

Vehicles 10 that are electrified vehicle are further classified into the following three categories. That is, the first electrified vehicle is an electrified vehicle that is provided with a mechanism capable of externally charging the electric power of the battery and is capable of traveling only by the battery (hereinafter referred to as battery electric vehicle). The second electrified vehicle is a hybrid-type electrified vehicle (hereinafter referred to as a hybrid electric vehicle) that further includes a power generation motor generated by an internal combustion engine and can be driven by using a battery and an internal combustion engine in combination. The third electrified vehicle is a plug-in hybrid-type electrified vehicle (hereinafter referred to as plug-in hybrid electric vehicle) in which electric power to be charged to a battery provided in a hybrid electric vehicle can be supplied from the outside.

When the vehicle 10 is a battery electric vehicle or a plug-in hybrid electric vehicle capable of externally charging electric power, the point-providing system 1 corresponds to the case 1 illustrated in the upper drawing of FIG. 1. On the other hand, when the vehicle 10 is in a hybrid electric vehicle in which electric power cannot be charged from the outside, the point-providing system 1 corresponds to the case 2 illustrated in the lower drawing of FIG. 1.

As described above, in the point granting system 1 according to the first embodiment, the point granting system 1 according to the type of the vehicle 10 is applied. Note that the point granting system 1 of the case 2 shown in the lower drawing of FIG. 1 is a part of the configuration of the point granting system 1 of the case 1 shown in the upper drawing of FIG. 1. Therefore, in the following, description will be given of the configuration of the point granting system 1 of the case 1 shown in the upper drawing of FIG. 1, and description of the configuration of the point granting system 1 of the case 2 shown in the lower drawing of FIG. 1 will be omitted.

The charging facility 20 is a device that supplies electric power to a battery included in the vehicle 10. The charging facility 20 is connected to a power system. The electric power supplied from the charging facility 20 includes electric power obtained from renewable energy in addition to electric power supplied from a thermal power plant or a nuclear power plant. Electricity derived from renewable energy means environmentally friendly electricity derived without carbon dioxide emissions. Examples of the renewable energy include electric power obtained by photovoltaic power generation and electric power obtained by wind power generation.

The management device 30 manages the point granting system 1. Typically, the management device 30 is a management server on the cloud. The management server may include a plurality of servers that perform distributed processing. The vehicle 10, the charging facility 20, and the management device 30 can communicate with each other via a communication network. Further, the management device 30 includes a point granting device 40 that determines a point to be imparted in accordance with the amount of carbon dioxide emission reduced by charging or traveling of the vehicle 10.

The vehicle 10 communicates with the management device 30 and transmits vehicle state information to the management device 30 as illustrated in FIG. 1. The vehicle state information includes identification information of the vehicle 10 and information on the remaining battery capacity of the vehicle 10. The charging facility 20 communicates with the management device 30, and transmits the ratio information of renewable energy to the management device 30 as shown in FIG. 1. Note that the information on the remaining battery level received by the management device 30 does not necessarily have to be transmitted from the vehicle 10. The remaining battery capacity of the vehicle 10 can be recognized by the charging facility 20 when the vehicle 10 performs charging. Therefore, the information on the remaining battery level may be transmitted from the charging facility 20 to the management device 30. In this case, the charging facility 20 also needs to transmit the identification information of the vehicle 10 corresponding to the information on the remaining battery level to the management device 30. The identification information of the vehicle 10 may be, for example, ID information of the vehicle 10. Further, the ratio information of the renewable energy may be transmitted to the management device 30 from the host apparatus that manages the power system.

Based on the vehicle state information and the power storage information of the renewable energy, the point granting device 40 determines the point to be imparted to the vehicle 10 in accordance with the carbon dioxide emission amount reduced by the charging of the vehicle 10. For example, when the vehicle 10 is charged, it can be said that the larger the ratio of the amount of electric power obtained from the renewable energy to the amount of electric power charged in the vehicle 10 is, the larger the amount of carbon dioxide emission reduced by the charging of the vehicle 10 is. Therefore, the point granting device 40 may determine the granting point in accordance with the ratio.

Further, the point granting device 40 determines a point to be imparted to the vehicle 10 in accordance with the amount of carbon dioxide emission reduced by the traveling of the vehicle 10, based on the vehicle state information. For example, when the vehicle 10 travels, it can be said that the smaller the amount of electric power used by the vehicle 10 travels (hereinafter, referred to as the amount of electric power used), the larger the amount of carbon dioxide emissions reduced by the vehicle 10 travels. Therefore, the point granting device 40 may determine the granting point according to the amount of power used. Alternatively, the award point may be determined according to the traveling distance per unit electric power (that is, the electric power cost) calculated on the basis of the traveling distance of the vehicle 10 and the amount of electric power used.

The point granting device 40 transmits the determined application point information to the vehicle 10. Note that the granted point information may be transmitted to the terminal device held by the user of the vehicle 10. In this way, it is realized that points are given in accordance with the amount of carbon dioxide emission reduced by charging or traveling of the vehicle 10.

Example of Points to be Applied During Charging

FIG. 2 is a diagram illustrating an example of an application point when the vehicle 10 is charged. The application point at the time of charging the vehicle 10 is determined based on the ratio of the amount of electric power obtained from the renewable energy to the amount of electric power charged in the vehicle 10. Specifically, as shown in FIG. 2, when the vehicle 10 is in an electrified vehicle in which electric power can be charged from the outside and the ratio of the amount of electric power obtained from renewable energy to the amount of electric power charged in the vehicle 10 is 100%, the carbon dioxide generated by the charging of the vehicle 10 is not discharged. In this case, since the degree of contribution to the carbon dioxide emission amount reduced by the charging of the vehicle 10 is the highest, the award point for the vehicle 10 is a full score (hereinafter, referred to as a first point). The criterion of the full score may be determined according to, for example, the magnitude of the charged amount of electric power.

Further, as shown in FIG. 2, when the vehicle 10 is an electrified vehicle capable of externally charging electric power, and the ratio of the amount of electric power obtained from renewable energy to the amount of electric power charged in the vehicle 10 is less than 100%, carbon dioxide is discharged by charging the vehicle 10. Here, since the degree of contribution to the carbon dioxide emission reduced by the charging of the vehicle 10 is lower than the above-described electrified vehicle, the application point to the vehicle 10 is set to a second point lower than the first point. Note that the value of the second point may be determined according to the ratio of the amount of electric power obtained from renewable energy as shown in the lower graph, that is, according to the reduced amount of carbon dioxide emissions.

Still further, as shown in FIG. 2, when the vehicle 10 is in an electrified vehicle in which electric power cannot be charged from the outside, the points for the vehicle 10 are not given because the information required for calculating the given point cannot be obtained. As described above, in the point granting device 40 according to the first embodiment, the application point to the vehicle 10 is determined on the basis of the type of the vehicle 10 and the carbon dioxide emission amount reduced by the charging of the vehicle 10.

Example of Points to be Given During Traveling

FIG. 3 is a diagram illustrating an example of an application point determined by traveling of the vehicle 10. The point to be given when the vehicle 10 is traveling is determined based on the actual electric power cost achieved by the traveling of the vehicle 10 and the model electric power cost. The actual electric power cost refers to the above-described electric power cost, and means a traveling distance per unit electric power. The model electricity cost means the average electricity cost predicted from the traveling route. The average electricity cost is calculated by, for example, machine learning that takes vehicle information (vehicle type, weight, etc.), travel distance history information, and travel state information (vehicle speed, accelerator opening degree, etc.) included in the big data as inputs.

Specifically, as shown in FIG. 3, when the vehicle 10 is in an externally chargeable electrified vehicle and the vehicle 10 is in a battery electric vehicle, an application point at the time of traveling of the vehicle 10 is determined based on the following conditions. In a case where the actual electric power cost is a condition equal to or higher than the model electric power cost, the carbon dioxide caused by the traveling of the vehicle 10 is not discharged, and the degree of contribution to the reduced carbon dioxide emission amount is the highest, so that the award point for the vehicle 10 is regarded as a full score (hereinafter, referred to as a third point). On the other hand, in a case where the actual electric power cost is less than the model electric power cost, although the carbon dioxide caused by the traveling of the vehicle 10 is not discharged, the actual electric power cost in this case is lower than the actual electric power cost under the above-described condition, and therefore, the grant point for the vehicle 10 is set as the fourth point lower than the third point. Note that the value of the fourth point may be determined in accordance with the actual electricity cost as indicated by a solid line in the lower graph.

Further, as shown in FIG. 3, when the vehicle 10 is in an electrified vehicle in which electric power can be charged from the outside and the vehicle 10 is plug-in hybrid electric vehicle, an application point at the time of traveling of the vehicle 10 is determined based on the following conditions. Specifically, in a case where the actual electricity cost is a condition equal to or higher than the model electricity cost, the carbon dioxide caused by the traveling of the vehicle 10 is not discharged, and it is considered that the degree of contribution to the reduced carbon dioxide emission amount is the highest, and the granting point is the third point. In addition, in a case where the actual electric power consumption is a condition less than the model electric power consumption, it is highly likely that carbon dioxide is discharged by the operation of the internal combustion engine, and therefore, in this case, a point for the vehicle 10 is not given as indicated by a broken line in the graph at the lower stage.

Still further, as shown in FIG. 3, when the vehicle 10 is not in an electrified vehicle in which electric power can be charged from the outside (that is, when the vehicle 10 is in hybrid electric vehicle), the application point to the vehicle 10 is the same as the application point to plug-in hybrid electric vehicle described above. As described above, in the point granting device 40 according to the first embodiment, the granting point for the vehicle 10 is determined on the basis of the type of the vehicle 10 and the actual electric power cost achieved by the traveling of the vehicle 10.

Example of Point Granting Device

Configuration Example

FIG. 4 is a block diagram illustrating a configuration example of the point granting device 40 according to the first embodiment. The point granting device 40 includes an information processing device 41 and a communication device 44.

The communication device 44 communicates with the outside of the point granting device 40. For example, the communication device 44 communicates with the vehicle 10 and the charging facility 20.

The information processing device 41 is a computer that performs processing for determining a granting point for the vehicle 10. The information processing device 41 includes one or a plurality of processors 42 (hereinafter, simply referred to as processors 42) and one or a plurality of storage devices 43 (hereinafter, simply referred to as storage devices 43). The processor 42 executes various processes. Examples of the processor 42 include Central Processing Unit (CPU), Field-Programmable Gate Array (FPGA), Application Specific Integrated Circuit (ASIC), and the like. The storage device 43 stores various kinds of information necessary for processing by the processor 42. Examples of the storage device 43 include volatile memory, non-volatile memory, Hard Disk Drive (HDD), Solid State Drive (SSD), and the like.

The various types of information stored in the storage device 43 include vehicle state information acquired from the vehicle 10, ratio information of renewable energy acquired from the charging facility 20, and assignment point information transmitted to the vehicle 10. The vehicle state information further includes information on the remaining battery amount, vehicle information (identification information, vehicle type, weight, and the like), history information on the travel distance, and travel state information (vehicle speed, accelerator operation amount, and the like).

The point granting program PROG is a computer program executed by the processor 42. The processor 42 executes the point-granting program PROG to realize the functions of the information processing device 41. The point-granting-program PROG is stored in the storage device 43. Alternatively, the point-granting program PROG may be stored in a memory built in the processor 42. Alternatively, the point-providing-program PROG may be recorded on a computer-readable recording medium.

Example of Processing During Charging of a Vehicle

Figure 5:
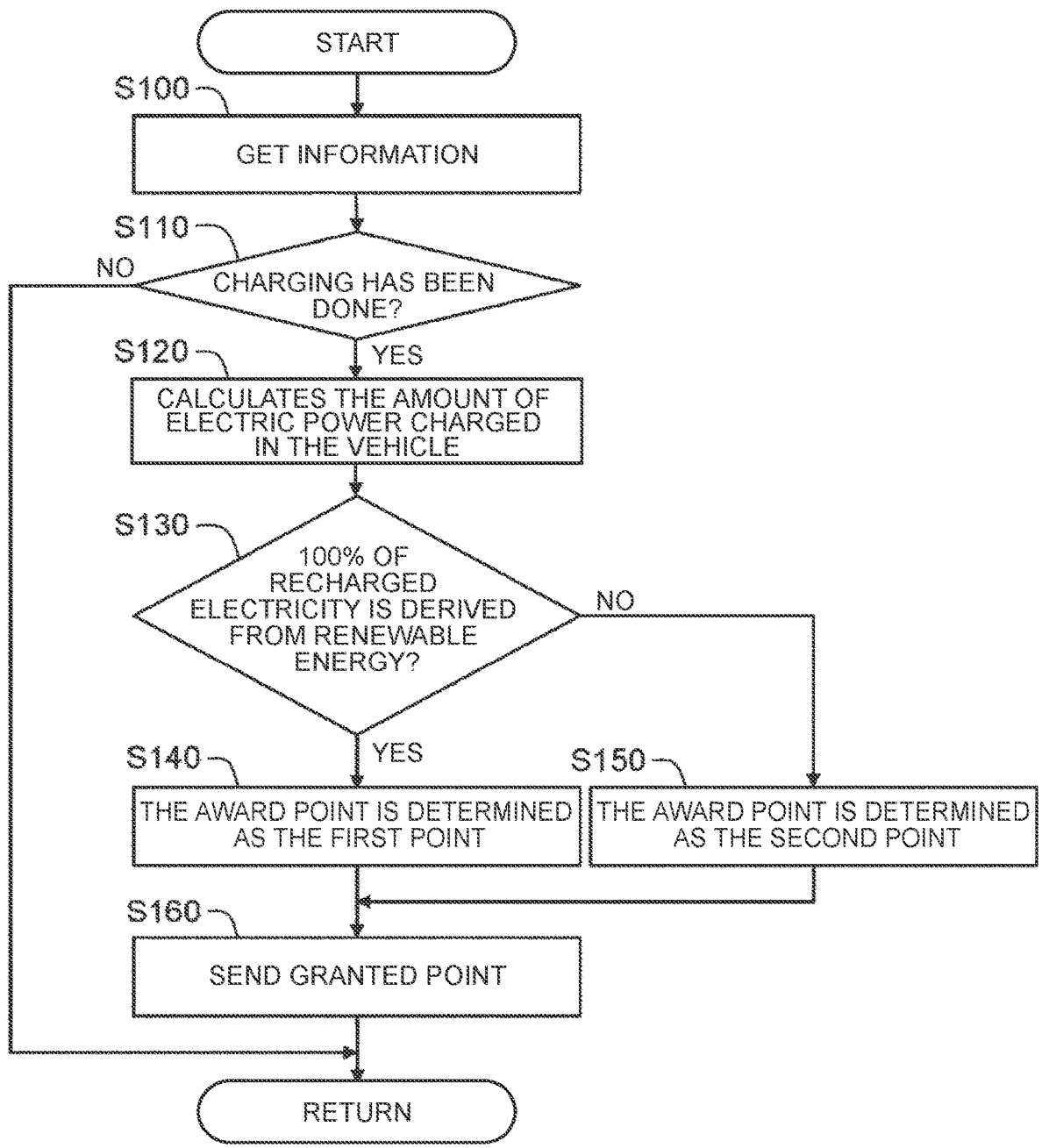
FIG. 5 is a flowchart illustrating an example of processing at the time of charging of the point granting device according to the first embodiment.

FIG. 5 is a flowchart illustrating an example of processing at the time of charging of the point granting device 40. The routine illustrated in FIG. 5 is repeatedly executed at a predetermined cycle.

In S100, the information processing device 41 acquires various types of information stored in the storage device 43. Thereafter, the process proceeds to S110.

In S110, the information processing device 41 determines whether or not the vehicles 10 have been charged based on various types of information. If it is determined that the vehicles 10 have been charged, the process proceeds to S120. Otherwise, the process ends.

In S120, the information processing device 41 calculates the electric power charged in the battery of the vehicle 10 based on the information of the remaining battery level. Thereafter, the process proceeds to S130.

In S130, the information processing device 41 determines whether or not the ratio of the amount of electric power obtained by the renewable energy to the amount of electric power charged in the battery of the vehicle 10 is 100%. If it is determined that the percentage is 100%, the process proceeds to S140. Otherwise, the process proceeds to S150.

In S140, the information processing device 41 determines that the point to be given to the vehicles 10 is the first point. The details of the first point are as described above.

In S150, the information processing device 41 determines that the point to be given to the vehicles 10 is the second point. The details of the second point are as described above. In a case where the ratio is 0%, the information processing device 41 determines that there is no point to be given to the vehicle 10.

In S160, the information processing device 41 transmits the determined award point to the vehicles 10.

Example of Processing When the Vehicle is Running

Figure 6:
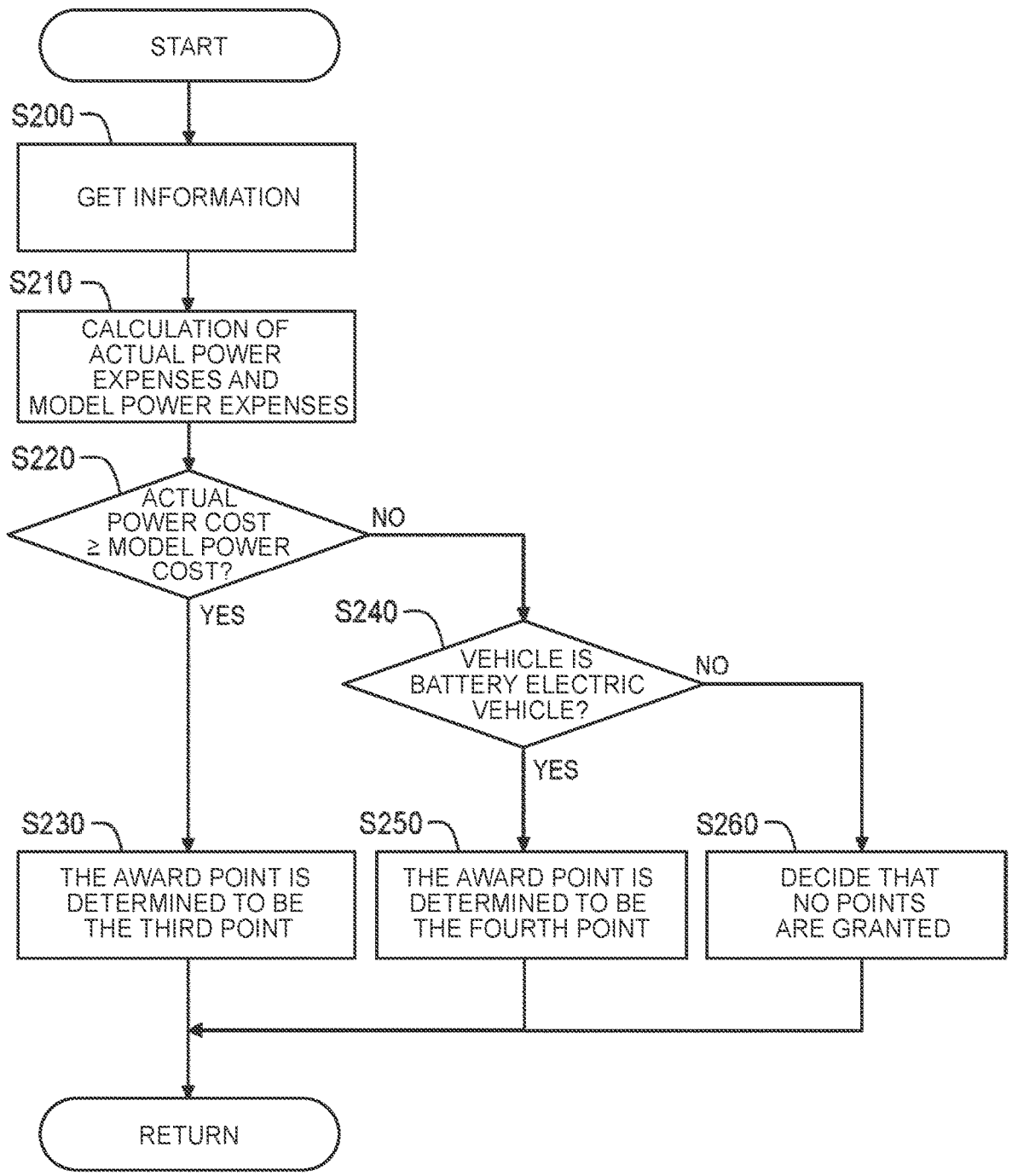
FIG. 6 is a flowchart illustrating an example of processing at the time of traveling of the point granting device according to the first embodiment.

FIG. 6 is a flowchart illustrating an example of a process performed when the point granting device 40 is traveling. The routine illustrated in FIG. 6 is repeatedly executed at a predetermined cycle.

In S200, the information processing device 41 acquires various types of information stored in the storage device 43. Thereafter, the process proceeds to S210.

In S210, the information processing device 41 calculates the amount of electric power (also referred to as the amount of electric power used) used by traveling based on the information of the remaining battery amount. Further, the information processing device 41 calculates the actual electric power cost based on the history information of the traveling distance and the calculated electric power usage amount. Furthermore, the information processing device 41 calculates the model power cost based on the vehicle state information. The calculation example of the model power cost is as described above. Thereafter, the process proceeds to S220.

In S220, the information processing device 41 determines whether the actual electric power cost is equal to or higher than the modeled electric power cost. When it is determined that the actual electric power cost is equal to or higher than the modeled electric power cost, the process proceeds to S230.

In S230, the information processing device 41 determines that the point to be given to the vehicles 10 is the third point. The details of the third point are as described above.

If it is determined in S220 that the actual electric power cost is less than the modeled electric power cost, the process proceeds to S240. In S240, the information processing device 41 determines whether or not the vehicles 10 are battery electric vehicle. If it is determined that the vehicle 10 is battery electric vehicle, the process proceeds to S250. Otherwise, the process proceeds to S260.

In S250, the information processing device 41 determines that the point to be given to the vehicles 10 is the fourth point. The details of the fourth point are as described above.

In S260, the information processing device 41 determines that there is no point to be given to the vehicles 10.

Embodiment 2

Example of Points to be Applied During Charging

In the second embodiment, the charging facility 20 is configured as a device that includes a battery that stores electric power generated by a solar cell, and supplies electric power stored in the battery to the vehicle 10. When the vehicle 10 is in an electrified vehicle in which electric power can be externally charged, an application point at the time of charging of the vehicle 10 is determined based on a ratio of electric power obtained from renewable energy to electric power charged in the vehicle 10. Here, a method for the user of the vehicle 10 to obtain a higher award point will be considered. If it is possible to charge the vehicle 10 after grasping the state of the electric power obtained from the renewable energy, the degree of contribution to the reduced carbon dioxide emission is increased, and therefore, the user of the vehicle 10 is likely to obtain a higher award point. Therefore, according to the point granting device 40 of the second embodiment, the optimum charging timing is determined based on the state of the electric power obtained from the renewable energy before the charging of the vehicle 10.

Figure 7:
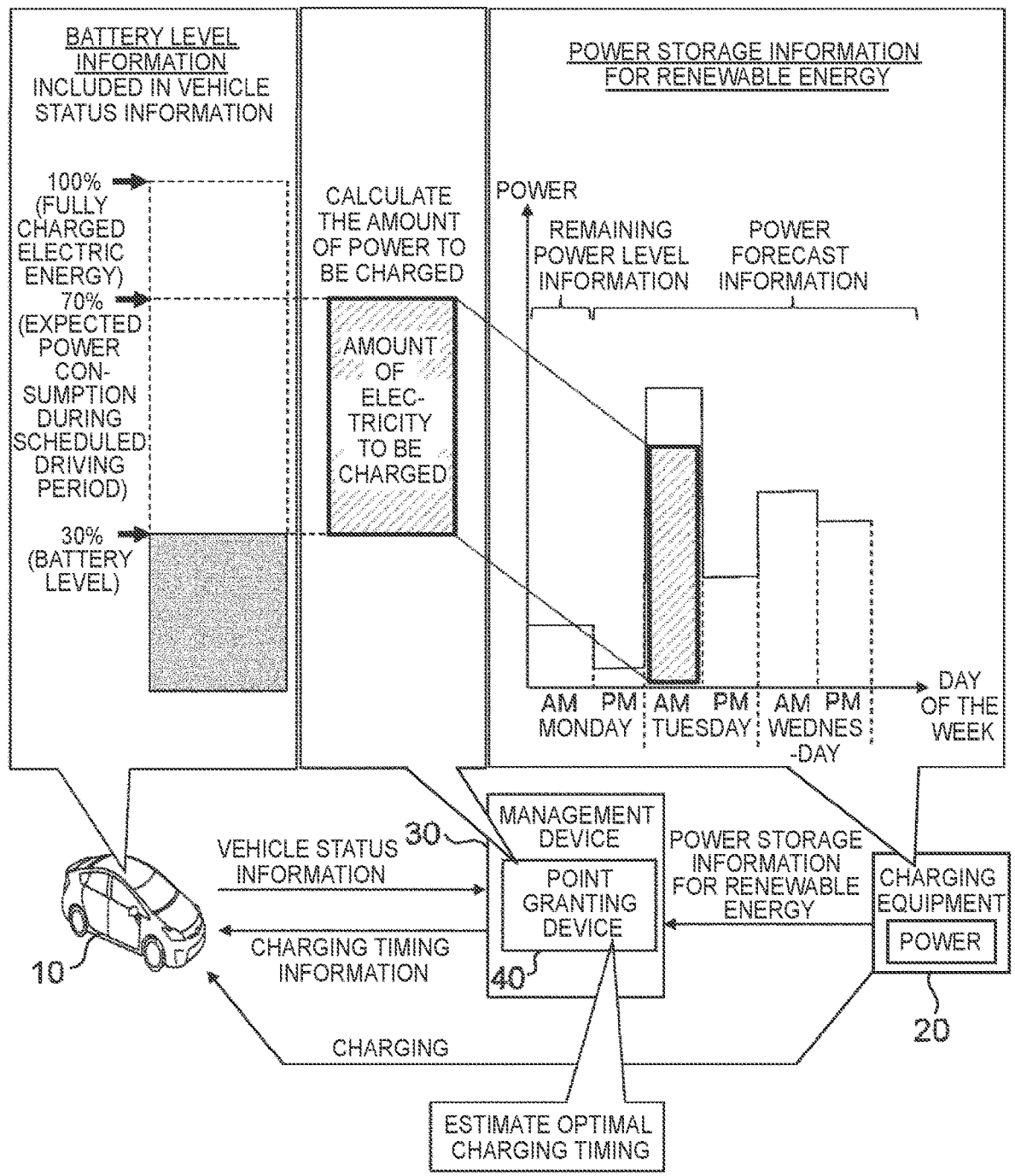
FIG. 7 is a diagram illustrating an example of charging timing of a point granting device according to Embodiment 2.

FIG. 7 is a diagram illustrating an example of charging timing in the point granting device 40 according to the second embodiment. Specifically, FIG. 7 shows information on the remaining battery capacity of the vehicle 10 included in the vehicle state information and power storage information of renewable energy of the charging facility 20. The power storage information of the renewable energy further includes information on a remaining amount of electric power obtained from the renewable energy and prediction information on electric power obtained from the renewable energy. The prediction information of the electric power obtained from the renewable energy is predicted based on information such as a weather forecast, for example.

The point granting device 40 estimates the power consumption expected in the scheduled traveling period on the basis of the vehicle state information including the information on the remaining battery amount and the history information on the traveling distance. The point granting device 40 calculates an amount of electric power (hereinafter, referred to as an amount of electric power to be charged) of a difference between the estimated amount of electric power consumption and the remaining battery amount. FIG. 7 illustrates an example in which the amount of power consumed in the scheduled traveling period exceeds the remaining battery amount. In this case, the vehicle 10 needs to charge the amount of electric power to be charged by the charging facility 20. The electric power consumption amount predicted in the scheduled traveling period means, for example, the electric power consumption amount in the next week predicted based on the electric power consumption amount in the traveling actual distance in the past week. Note that the amount of electric power to be charged is not necessarily limited to the electric power of the difference between the amount of electric power consumed and the remaining battery amount. The amount of electric power to be charged may be, for example, the electric power of the difference between the amount of electric power and the remaining amount of battery in the full charge of the battery when the vehicle 10 requests the full charge of the battery.

The point granting device 40 predicts the optimum charging timing based on the information of the amount of electric power to be charged and the power storage information of the renewable energy. Specifically, the point granting device 40 predicts the timing when the ratio of the amount of electric power obtained/obtained from the renewable energy to the amount of electric power to be charged of the vehicle 10 becomes the highest.

The point granting device 40 predicts that the timing is the optimum charging timing. In the embodiment illustrated in FIG. 7, it is predicted that the optimum charge timing is "Tuesday AM" in the point granting device 40. Further, at the charging timing, the ratio of the amount of electric power obtained/obtained from renewable energy to the amount of electric power to be charged in the vehicle 10 is 100%. Therefore, when the vehicle 10 performs charging at the charging timing, there is a high possibility that the first point (full score) is given. Therefore, the point granting device 40 notifies the terminal device held by the vehicle 10 or the user of the vehicle 10 of the charging timing.

Example of Charging Process

Figure 8:
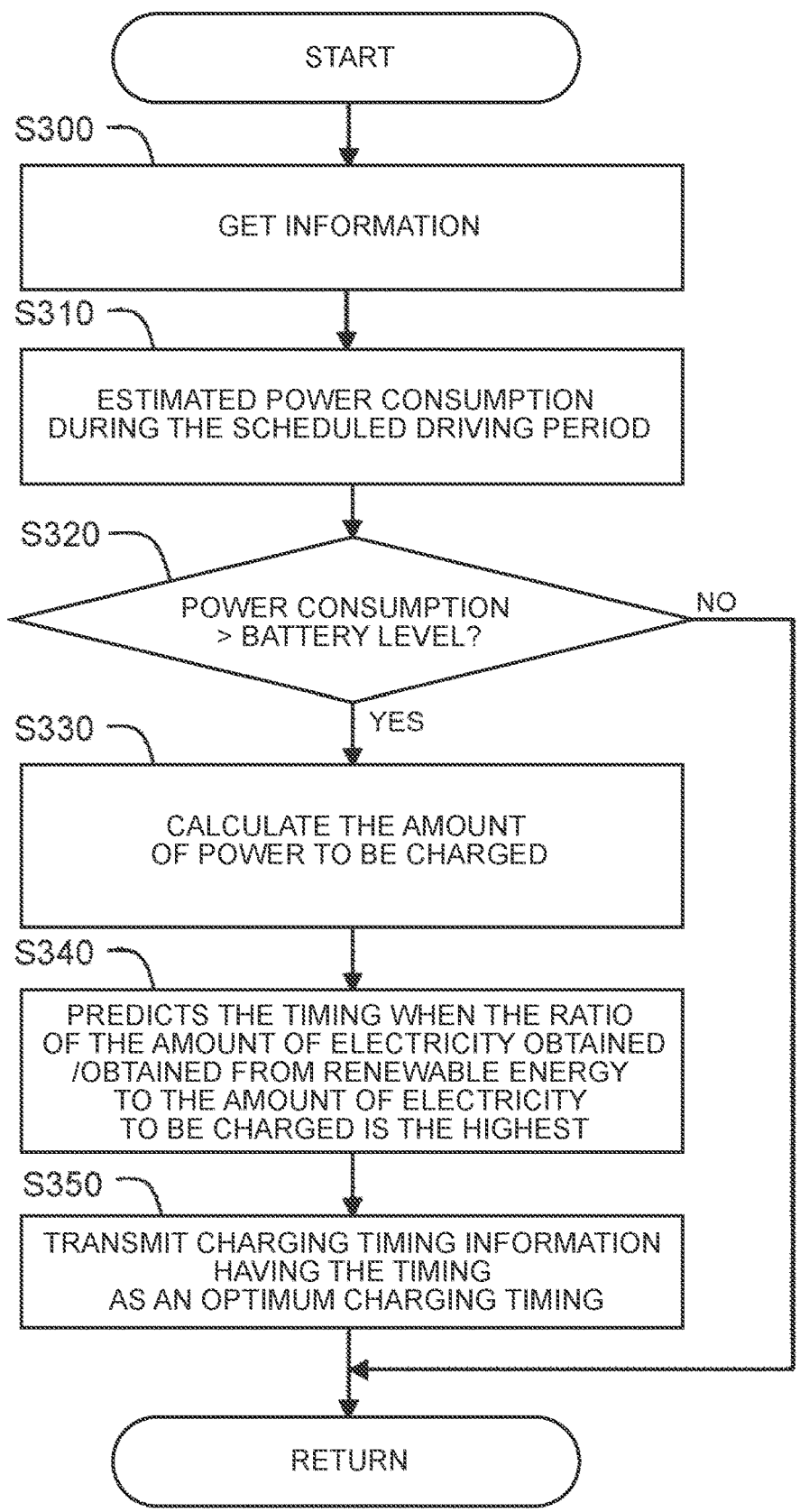
FIG. 8 is a flowchart illustrating an example of processing at the time of charging of the point granting device according to the second embodiment.

FIG. 8 is a flowchart illustrating an example of processing at the time of charging of the point granting device 40. The routine illustrated in FIG. 8 is repeatedly executed at a predetermined cycle.

In S300, the information processing device 41 acquires various types of information stored in the storage device 43. Thereafter, the process proceeds to S310.

In S310, the information processing device 41 estimates power consumed in the scheduled traveling time based on various types of information. Thereafter, the process proceeds to S320.

In S320, the information processing device 41 determines whether or not the amount of power consumed is larger than the remaining battery amount. If it is determined that the amount of power consumed is greater than the remaining battery amount, the process proceeds to S330. Otherwise, the process ends.

In S330, the information processing device 41 calculates the amount of electric power to be charged, which is the difference between the consumed electric power and the remaining battery amount. Thereafter, the process proceeds to S340.

In S340, the information processing device 41 predicts the timing at which the ratio of the amount of electric power obtained/obtained from the renewable energy to the amount of electric power to be charged is highest. Thereafter, the process proceeds to S350.

In S350, the information processing device 41 transmits, to the vehicles 10, charging timing information in which the timing is the optimum charging timing. Note that the charging timing information may be transmitted to the terminal device held by the user of the vehicle 10.

OTHER EMBODIMENTS

When the solar panel is mounted on the vehicle 10, the electric power generated by the solar panel can be charged to the battery. In this case, the amount of electric power obtained from the solar panel is taken into consideration in calculating the ratio of the amount of electric power obtained from the renewable energy to the amount of electric power charged.

What is claimed is:

1. A point granting system that grants a point in accordance with a carbon dioxide emission amount reduced by use of an electrified vehicle, comprising:
   the electrified vehicle;
   a charging facility that supplies electric power to a battery in the electrified vehicle, wherein the electric power supplied from the charging facility includes electric power obtained from renewable energy; and
   a management device, wherein the electrified vehicle, the charging facility and the management device communicate with each other via a communication network,
   wherein the management device includes at least one processor programmed to:
   when the electrified vehicle is an externally chargeable vehicle, grant a point in accordance with a ratio of an electric power amount obtained from the renewable energy to a charged electric power amount;
   when the electrified vehicle is a vehicle that travels using electric power, grant the point in response to an actual electric power cost achieved by traveling being equal to or higher than a model electric power cost;
   obtain information from the electrified vehicle that travels using the electric power;
   calculate an amount of electric power to be charged by the electrified vehicle based on the obtained information, wherein the amount of electric power to be charged is a difference between consumed electric power and a remaining battery amount;
   when the electrified vehicle is the externally chargeable vehicle, predict a timing at which a ratio of the electric power amount obtained from the renewable energy to the amount of electric power to be charged from the charging facility by the electrified vehicle becomes highest; and
   transmit the predicted timing to the electrified vehicle as an optimal charge timing for the electrified vehicle to be charged by the charging facility.

2. The point granting system according to claim 1, wherein:
   in a case where the electrified vehicle is the externally chargeable vehicle, when the ratio of the electric power amount obtained from the renewable energy is 100%, the at least one processor is further programmed to grant a first point; and
   when the ratio is less than 100%, the at least one processor is further programmed to grant a second point lower than the first point in accordance with the ratio.

3. The point granting system according to claim 1, wherein:
   in a case where the electrified vehicle is the vehicle that travels using electric power, when the actual electric power cost is equal to or higher than the model electric power cost, the at least one processor is further programmed to grant a third point; and
   when the actual electric power cost is less than the model electric power cost, the at least one processor is further programmed to grant a point lower than the third point or does not grant a point.

4. The point granting system according to claim 3, wherein:
   the electrified vehicle includes a battery electric vehicle that is provided with a mechanism allowing external charging of electric power and that is able to travel only with charged electric power;
   in a case where the electrified vehicle is the vehicle that travels using electric power and the actual electric power cost is less than the model electric power cost, and further when the electrified vehicle is the battery electric vehicle, the at least one processor grants a fourth point lower than the third point; and
   in a case where the electrified vehicle is the vehicle that travels using electric power and the actual electric power cost is less than the model electric power cost, and further when the electrified vehicle is not the battery electric vehicle, the at least one processor does not grant a point.

5. The point granting system according to claim 1, wherein:
   the consumed electric power and the remaining battery amount are predicted during a scheduled traveling period of the electrified vehicle; and
   when the electrified vehicle is the externally chargeable vehicle, and further when the amount of the electric power to be charged is larger than the remaining battery amount, the at least one processor notifies the electrified vehicle of the optimal charge timing.

\* \* \* \* \*